US010547187B2

(12) United States Patent
Yoon et al.

(10) Patent No.: US 10,547,187 B2
(45) Date of Patent: Jan. 28, 2020

(54) ELECTRONIC DEVICE AND EXTERNAL DEVICE CHARGING METHOD

(71) Applicant: Samsung Electronics Co., Ltd., Gyeonggi-do (KR)

(72) Inventors: Sung Geun Yoon, Gyeonggi-do (KR); Chul Woo Park, Gyeonggi-do (KR); Min Jeong Lee, Gyeonggi-do (KR); Ku Chul Jung, Seoul (KR)

(73) Assignee: Samsung Electronics Co., Ltd (KR)

( * ) Notice: Subject to any disclaimer, the term of this patent is extended or adjusted under 35 U.S.C. 154(b) by 62 days.

(21) Appl. No.: 15/446,694

(22) Filed: Mar. 1, 2017

(65) Prior Publication Data
US 2017/0256968 A1 Sep. 7, 2017

(30) Foreign Application Priority Data

Mar. 4, 2016 (KR) ........................ 10-2016-0026596

(51) Int. Cl.
H02J 7/00 (2006.01)
H01R 24/60 (2011.01)
H01R 107/00 (2006.01)

(52) U.S. Cl.
CPC ............ *H02J 7/0045* (2013.01); *H01R 24/60* (2013.01); *H02J 7/007* (2013.01); *H01R 2107/00* (2013.01); *H02J 2007/0062* (2013.01); *H02J 2007/0095* (2013.01); *H02J 2007/0096* (2013.01)

(58) Field of Classification Search
CPC .......... H02J 7/0045; H02J 7/0004; H02J 7/04; H02J 7/0062

USPC ......................................................... 320/111
See application file for complete search history.

(56) References Cited

U.S. PATENT DOCUMENTS

| 9,431,841 | B2 | 8/2016 | Inha et al. | |
| 9,748,782 | B1* | 8/2017 | Sheng | G06F 1/266 |
| 2015/0137746 | A1* | 5/2015 | Lee | H02J 5/005 |
| | | | | 320/108 |
| 2015/0160674 | A1* | 6/2015 | Burdette | G05F 1/66 |
| | | | | 700/295 |
| 2015/0270733 | A1 | 9/2015 | Inha et al. | |
| 2016/0117274 | A1* | 4/2016 | Waters | G06F 13/362 |
| | | | | 710/106 |
| 2016/0329730 | A1* | 11/2016 | Shiu | H02J 7/0004 |
| 2017/0093165 | A1* | 3/2017 | Liao | H02J 5/00 |

(Continued)

*Primary Examiner* — Jerry D Robbins
(74) *Attorney, Agent, or Firm* — The Farrell Law Firm, P.C.

(57) ABSTRACT

An electronic device is provided which includes a connector connected with an external electronic device, a plug connected with an external power source, a power supply circuit that supplies power to the external electronic device through the connector, a first charging module configured to receive first protocol-related charging request information and change a charging voltage and a charging current of the power supply circuit based on the charging request information, a second charging module configured to receive second protocol-related charging request information from the external electronic device, and a processor configured to convert the second protocol-related charging request information to the first protocol-related charging request information and transmit the converted first protocol-related charging request information to the first charging module.

7 Claims, 6 Drawing Sheets

(56) References Cited

U.S. PATENT DOCUMENTS

2017/0170734 A1* 6/2017 Sheng ............... H02M 3/33507
2017/0201107 A1* 7/2017 Yang .................... H02J 7/0044

* cited by examiner

ELECTRONIC DEVICE AND EXTERNAL DEVICE CHARGING METHOD

PRIORITY

This application claims priority under 35 U.S.C. § 119(a) to Korean Patent Application Serial No. 10-2016-0026596, which was filed on Mar. 4, 2016, in the Korean Intellectual Property Office, the entire disclosure of which is incorporated herein by reference.

BACKGROUND

1. Field of the Disclosure

The present disclosure relates generally to an electronic device, and more particularly, to a method of charging an electronic device by using a quick charging technology.

2. Description of the Related Art

With the development of electronic technologies, various types of electronic products are being developed and distributed. In particular, the development and distribution of portable electronic devices such as smartphones and tablet PCs has been expanded.

A user may desire to carry a portable electronic device, and thus, the portable electronic device uses a battery, which is embedded in the portable electronic device and may be removable, as a power supply source. Since the battery capacity is limited, if the remaining battery capacity of the portable electronic device is insufficient, a user needs to charge the battery by using a charging device.

Various charging technologies have been developed to reduce battery charging time. To charge the portable electronic device, one of the charging technologies exchanges information about charging between the portable electronic device and the charging device and performs charging by using a specific voltage/current.

The various charging technologies may be applied to different protocols of signals for information exchange, and thus, the conventional charging technology needs to be changed to apply new charging technology.

SUMMARY

Aspects of the present disclosure are to address at least the above-mentioned problems and/or disadvantages and to provide at least the advantages described below.

Accordingly, an aspect of the present disclosure provides a charging method and a device that is capable of supporting charging technology through various protocols by adding a circuit capable of communicating with a conventional circuit without changing the design of the circuit supporting conventional charging technology included in a charging device.

In accordance with another aspect of the present disclosure, an electronic device is provided that includes a connector connected with an external electronic device, a plug connected with an external power source, a power supply circuit that supplies power to the external electronic device through the connector, a first charging module that receives first protocol-related charging request information and changes a charging voltage and a charging current of the power supply circuit based on the charging request information, a second charging module that receives second protocol-related charging request information from the external electronic device, and a processor that converts the second protocol-related charging request information to the first protocol-related charging request information and transmits the converted first protocol-related charging request information to the first charging module.

In accordance with another aspect of the present disclosure, an external electronic device charging method is provided which includes receiving, if the electronic device is connected with an external electronic device through a connector, second protocol-related charging request information from the external electronic device, converting the second protocol-related charging request information to first protocol-related charging request information, changing a charging voltage or a charging current based on the first protocol-related charging request information, and supplying power to the external electronic device through the connector based on the changed charging voltage or charging current.

In accordance with another aspect of the present disclosure, an electronic device is provided which includes a first connector including a first pin processed according to a first protocol, a second connector including a second pin processed according to a second protocol that is different from the first protocol, a plurality of signal lines for connecting the first connector with the second connector, and a control circuit electrically connected with the first connector and the second connector. The control circuit is configured to receive a first signal including information about an external electronic device, which is connected with the first connector, from at least a part of the first pin, to convert the first signal to a second signal, and to provide the second signal to at least a part of the second pin.

In accordance with another aspect of the present disclosure, an electronic device is provided which includes a connector connected with an external electronic device, a plug connected with an external power source, a plurality of signal lines that connect the connector with the plug, a control circuit electrically connected with the connector and the plug. The control circuit includes a first module, which receives a first signal from the connector based on a first protocol, and a second module, which receives a second signal from the connector based on a second protocol and converts the second protocol-related second signal to the first protocol-related first signal. The control circuit is configured to supply power to the external electronic device in response to the converted first signal.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
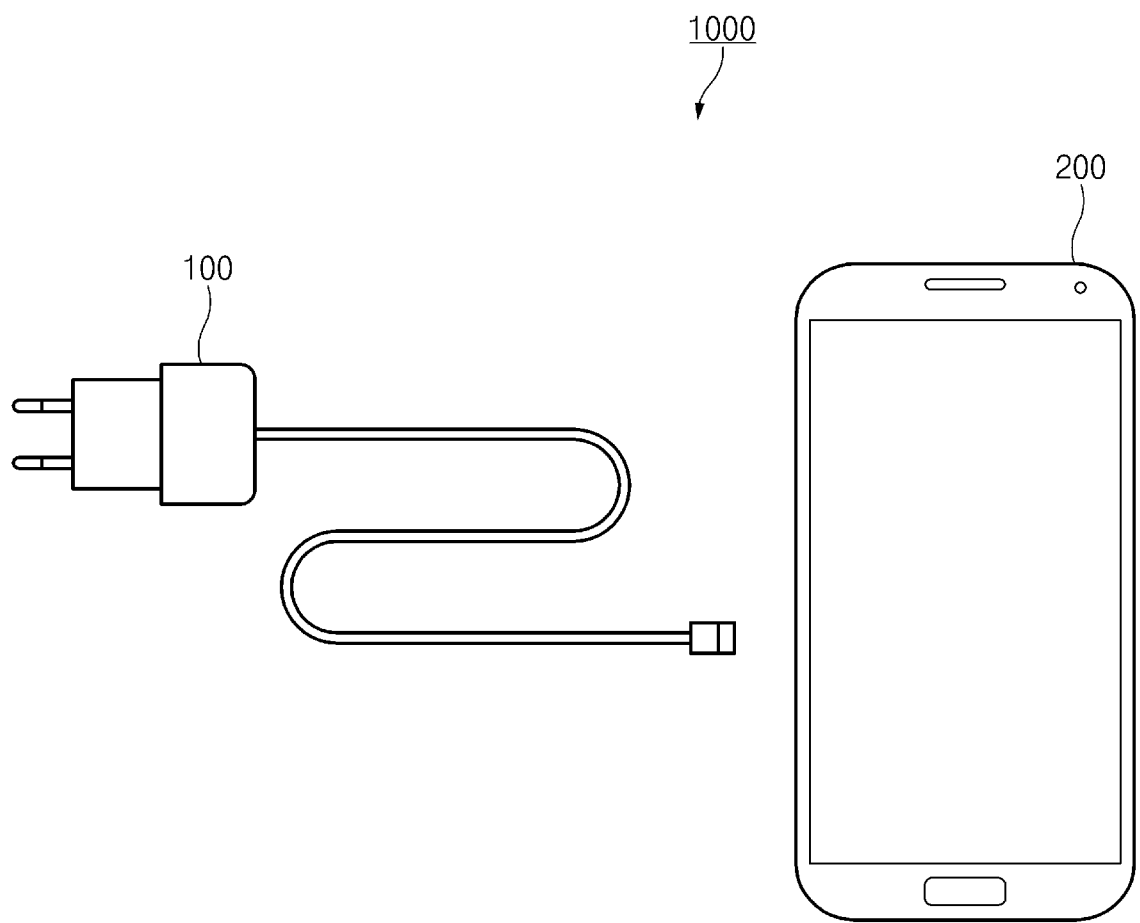
FIG. 1 illustrates a charging system of an electronic device, according to an embodiment of the present disclosure.

Hereinafter, certain embodiments of the present disclosure are disclosed with reference to the accompanying drawings. However, the present disclosure is not limited to a specific embodiment and it is intended that the present disclosure covers all modifications, equivalents, and/or alternatives of the present disclosure provided they come within the scope of the appended claims and their equivalents. With respect to the descriptions of the accompanying drawings, like reference numerals refer to like elements.

The terms "include," "comprise," "have", "may include," "may comprise" and "may have" as used herein indicate functions, operations, or existence of elements but do not exclude other functions, operations or elements.

In the present disclosure, the expressions "A or B", "at least one of A or/and B", "one or more of A or/and B", etc., as used herein, may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", etc. as used herein, may refer to various elements of an embodiment of the present disclosure, but do not limit the elements. For example, "a first user device" and "a second user device" may indicate different user devices regardless of the order or priority thereof. For example, without departing from the scope of the present disclosure, a first element may be referred to as a second element, and similarly, a second element may be referred to as a first element.

When an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when the first element is referred to as being "directly coupled with/to" or "directly connected to" the second element, it should be understood that there are no intervening elements.

According to the situation, the expression "configured to", as used herein, may be interchangeably used with the expression "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a general-purpose processor (e.g., a central processing unit (CPU) or an application processor) which performs corresponding operations by executing one or more software programs which are stored in a memory device.

The terms used in the present disclosure are used to describe specific embodiments and do not limit the scope of the present disclosure. The terms of a singular form may include plural forms unless otherwise specified. All the terms used herein, which include technical or scientific terms, may have the same meaning that is generally understood by a person skilled in the art. Terms, which are defined in a dictionary and commonly used, should also be interpreted as is customary in the relevant related art and not in an idealized or overly formal manners unless expressly so defined herein. In some cases, even if terms are terms are defined in the specification, they may not be interpreted to exclude embodiments of the present disclosure.

FIG. 1 illustrates a charging system, according to an embodiment of the present disclosure.

Referring to FIG. 1, a charging system 1000 includes an adapter device 100 and a terminal device 200. The adapter device 100 may receive power from an external or internal power source to charge the terminal device 200. For example, the adapter device 100 may charge the terminal device 200 by using power, which is supplied from an external power source through a plug, or power supplied from an internal battery.

The adapter device 100 may support a quick charging function. The adapter device 100 may support a plurality of quick charging technologies. If the adapter device 100 is connected with the terminal device 200, the adapter device 100 may charge the terminal device 200 by using a quick charging technology that the terminal device 200 supports or requests.

The terminal device 200 may be a portable electronic device including a battery. The terminal device 200 may be a portable electronic device such as a smartphone, a tablet PC, a wearable device (e.g., a smart watch), and the like. The terminal device 200 may be an electronic device supporting the quick charging function. In the case where the terminal device 200 supports a plurality of quick charging technologies, the terminal device 200 may be charged using one quick charging technology according to the selection of a user or a preference set in advance.

Figure 2:
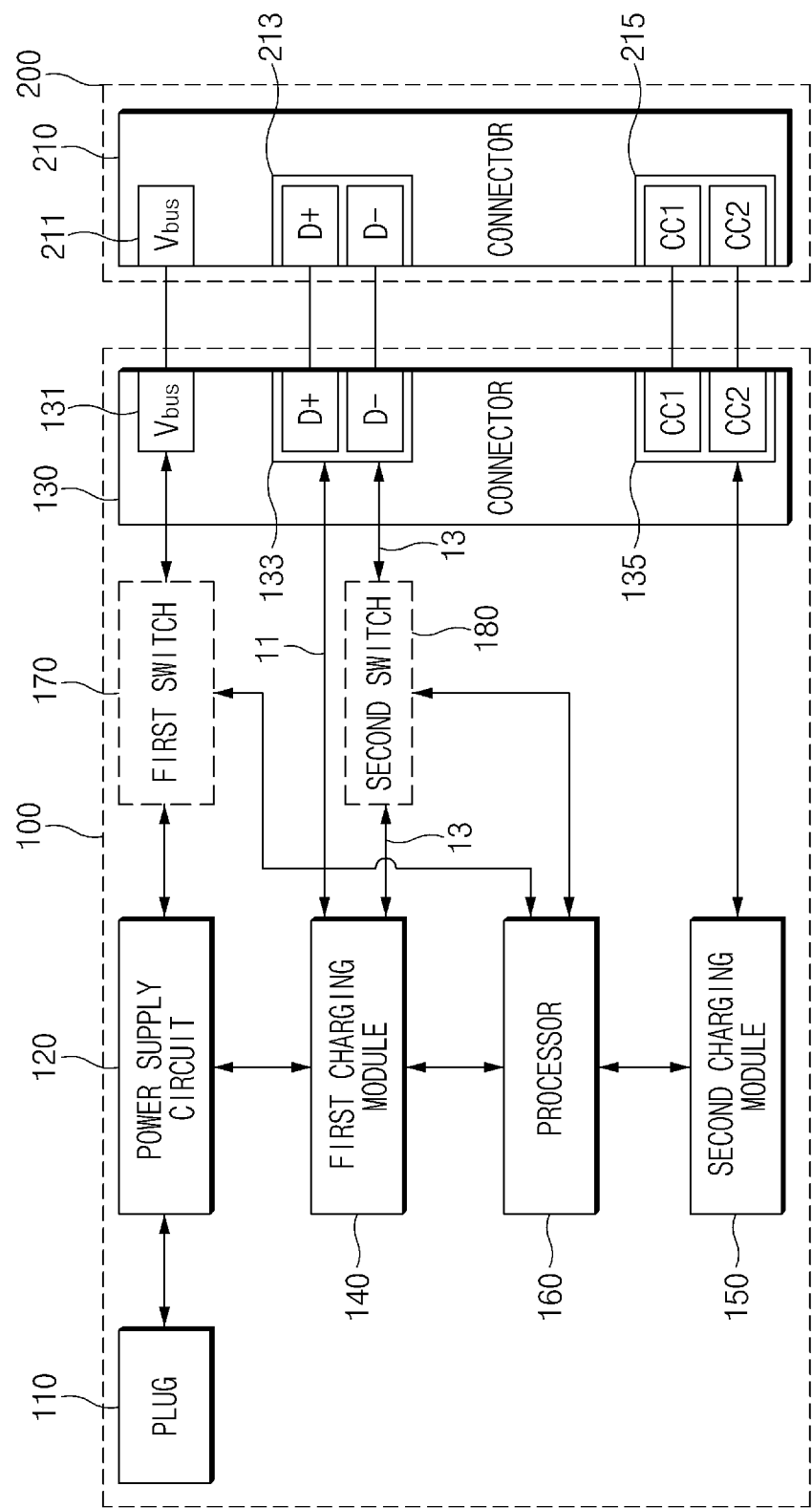
FIG. 2 is a block diagram of an adapter device, according to an embodiment of the present disclosure.

FIG. 2 is a block diagram of an adapter device, according to an embodiment of the present disclosure.

Referring to FIG. 2, the adapter device 100 includes a plug 110, a power supply circuit 120, a connector 130, a first charging module 140, a second charging module 150, a processor 160, a first switch 170, and a second switch 180.

The plug 110 may be electrically connected with an external power source and may receive power from the external power source. For example, the plug 110 may be connected with an external outlet and may receive the power from the outlet.

The adapter device 100 may include an internal battery for supplying power. For example, the adapter device 100 may include both the plug 110 and the internal battery or may include only one of the plug 110 and the internal battery.

The power supply circuit 120 may transmit the power, which is receive from the plug 110 (or the internal battery), to the terminal device 200 through a first pin 131 (e.g., a Vbus pin) of the connector 130. The power supply circuit 120 may include, for example, a pulse width modulation (PWM) module, an alternating current (AC) to direct current (DC) converter, and a synchronous rectifier. The PWM module may control a voltage of power received from an outlet (or an internal battery) through the modulation of a pulse width. The AC to DC converter may convert an alternating current, which is received from the outlet, to a direct current. The synchronous rectifier may improve charging efficiency by converting the low voltage direct current signal into the high voltage direct current signal. The power supply circuit 120 may change a charging voltage or a charging current under control of the first charging module 140.

The connector 130 may be connected with the terminal device 200. For example, the connector 130 may be connected with a connector 210 included in the terminal device 200. The connector 130 may be a USB type-C connector.

The USB type-C connector may be structurally divided into a first part and a second part, and the first part and the second part may have a symmetrical structure. As such, if the USB type-C connectors are connected with each other, the USB type-C connector may be connected regardless of orientation. The connector 130 may include a plurality of pins. The plurality of pins of the connector 130 may be in contact with a plurality of pins of the connector 210 included in the terminal device 200, respectively and may form paths that make it possible to transmit or receive signals.

The first charging module 140 may communicate with the terminal device 200 based on a first protocol. The first protocol may include a communication protocol using a second pin 133 (e.g., a D+ pin or a D− pin) of the connector 130. The first protocol may include an adaptive fast charge (AFC) protocol or a quick charge (QC) protocol.

The terminal device 200 is connected with the connector 130, the first charging module 140 may transmit or receive first protocol-related information by using the second pin 133 (e.g., a D+ pin or a D− pin) of the connector 130 and may recognize that the terminal device 200 is connected with the adapter device 100. For example, if the terminal device 200 is connected with the connector 130, the first charging module 140 may execute an operation based on a universal serial bus (USB) battery charging (BC) specification revision 1.2 (hereinafter referred to as "USB BC 1.2"). In a USB BC 1.2 procedure, each of the adapter device 100 (e.g., the first charging module 140) and the terminal device 200 may exchange information, perform a support function, and the like of the counterpart device.

After the first charging module 140 opens the second pin 133 (e.g., a D+ pin or a D− pin) of the connector 130 for a specified time period (e.g., 1 sec) after the USB BC 1.2 procedure, the first charging module 140 may execute an operation for the AFC or the QC. For example, the first charging module 140 may open the second pin 133 by disconnecting a path 11 that supplies power to the second pin 133 (e.g., a D+ pin or a D− pin) of the connector 130. If a second pin 213 (e.g., a D+ pin or a D− pin) of the connector 210 is opened for a specified time period (e.g., 1 sec), the terminal device 200 may recognize that the adapter device 100 supports the AFC.

The first charging module 140 may transmit a first voltage/current list, which the AFC or the QC supports and which is stored in an internal memory, to the terminal device 200 through the second pin 133 (e.g., a D+ pin or a D− pin) of the connector 130 based on the first protocol. The first charging module 140 may receive charging request information from the terminal device 200 through the second pin 133 (e.g., a D+ pin or a D− pin) of the connector 130 based on the first protocol. The charging request information may include, for example, information about a charging voltage or a charging current that the terminal device 200 requires. In the case where the terminal device 200 performs charging based on the first protocol, the terminal device 200 may select, for example, the charging voltage or the charging current based on the first voltage/current list. The first charging module 140 may change the charging voltage or the charging current of the power supply circuit 120 based on the charging request information that is received from the terminal device 200.

The second charging module 150 may communicate with the terminal device 200 based on a second protocol. The second protocol may include a communication protocol using a third pin 135 (e.g., a CC1 pin or a CC2 pin) of the connector 130. For example, the second protocol may include a USB power delivery (PD) protocol.

The terminal device 200 is connected with the connector 130, the second charging module 150 may transmit or receive second protocol-related information by using the third pin 135 (e.g., a CC1 pin or a CC2 pin) of the connector 130 and may recognize that the terminal device 200 is connected with the adapter device 100. For example, if a voltage across a pull-down resistor of the third pin 135 (e.g., a CC1 pin or a CC2 pin) of the connector 130 is changed from a first voltage to a second voltage (e.g., the voltage is changed from 5 V to 2 V), the second charging module 150 may recognize that the terminal device 200 (or an upstream facing port (UFP)) is connected with the adapter device 100. If a voltage across a pull-down resistor of the third pin 215 (e.g., a CC1 pin or a CC2 pin) of the connector 210 is changed from a third voltage to the second voltage (e.g., the voltage is changed from 0 V to 2 V), the terminal device 200 may recognize that the adapter device 100 (or a downstream facing port (DFP)) is connected with the terminal device 200. In the case where the adapter device 100 and the terminal device 200 are connected, the connector 130 of the adapter device 100 act as a host device (e.g., DFP), and the connector 210 of the terminal device 200 may act as a slave device (e.g., UFP)).

The second charging module 150 may transmit a second voltage/current list, which the USB PD supports and which is stored in the internal memory, to the terminal device 200 through the third pin 135 (e.g., a CC1 pin or a CC2 pin) of the connector 130 based on the second protocol. The second charging module 150 may receive charging request information from the terminal device 200 through the third pin 135 (e.g., a CC1 pin or a CC2 pin) of the connector 130 based on the second protocol. The charging request information may include, for example, information about a charging voltage or a charging current that the terminal device 200 requires. In the case where the terminal device 200 performs charging based on the second protocol, the terminal device 200 may select, for example, the charging voltage or the charging current based on the second voltage/current list. The second charging module 150 may transmit second protocol-related charging request information to the processor 160.

The processor 160 (e.g., a micro control unit (MCU)) may convert the second protocol-related charging request information (or a second signal), which is received from the second charging module 150, to first protocol-related charging request information (or a first signal). For example, the processor 160 may convert a second protocol-related packet structure to a first protocol-related packet structure. The processor 160 may transmit the first protocol-related charging request information to the first charging module 140.

The first charging module 140 may change the charging voltage or the charging current of the power supply circuit 120 based on the first protocol-related charging request information received from the processor 160.

At least a part of the first voltage/current list, which the first charging module 140 supports, and the second voltage/current list which the second charging module 150 supports may be different. Information about the charging voltage or the charging current, which is included in the charging request information, may be different from the first voltage/current list, the first charging module 140 may change the charging voltage or the charging current to be provided to the terminal device 200 in view of a mapping table stored in the internal memory. For example, the mapping table may refer to a list in which items included in the second voltage/current list are mapped to items included in the first voltage/current list, respectively. The first charging module 140 may change the charging voltage or the charging current of the power supply circuit 120 based on a first charging voltage or a first charging current, which is respectively mapped to a second charging voltage or a second charging current corresponding to voltage and current information included in the charging request information. Even though information about a charging voltage or a charging current, which is included in the charging request information, may be different from the first voltage/current list, the first charging module 140 may change a charging voltage or a charging current of the power supply circuit 120 based on the information about the charging voltage or the charging current, which is included in the charging request information.

Although FIG. 2 illustrates the second charging module 150 and the processor 160 as being separated, the present disclosure is not limited thereto, and the second charging module 150 and the processor 160 may be implemented with one or more hardware modules (or a chip).

The first switch 170 may be located between the power supply circuit 120 and the first pin 131 (e.g., a Vbus pin) of the connector 130. The first switch 170 may control power, which the power supply circuit 120 supplies to the first pin of the connector 130, under control of the processor 160. In a state where the terminal device 200 is not connected with the connector 130, the processor 160 may turn off the first switch 170. In a state where the terminal device 200 is connected with the connector 130, the processor 160 may turn on the first switch 170. The first switch 170 may be controlled by the first charging module 140 or the second charging module 150.

The second switch 180 may be located between the first charging module 140 and the second pin 133 (e.g., a D+ pin or a D− pin) of the connector 130. The second switch 180 may control a data transmission path 13 between the first charging module 140 and the second pin 133 of the connector 130 under control of the processor 160. If a signal based on the second protocol is transmitted or received through the second charging module 150, the processor 160 may turn off the second switch 180. The second switch 180 may be controlled by the second charging module 150. At least a part of the first switch 170 and the second switch 180 may be omitted.

The charging technology using the second protocol may be supported by adding the second charging module 150 and the processor 160 to an adapter device supporting charging technology using the first protocol.

Figure 3:
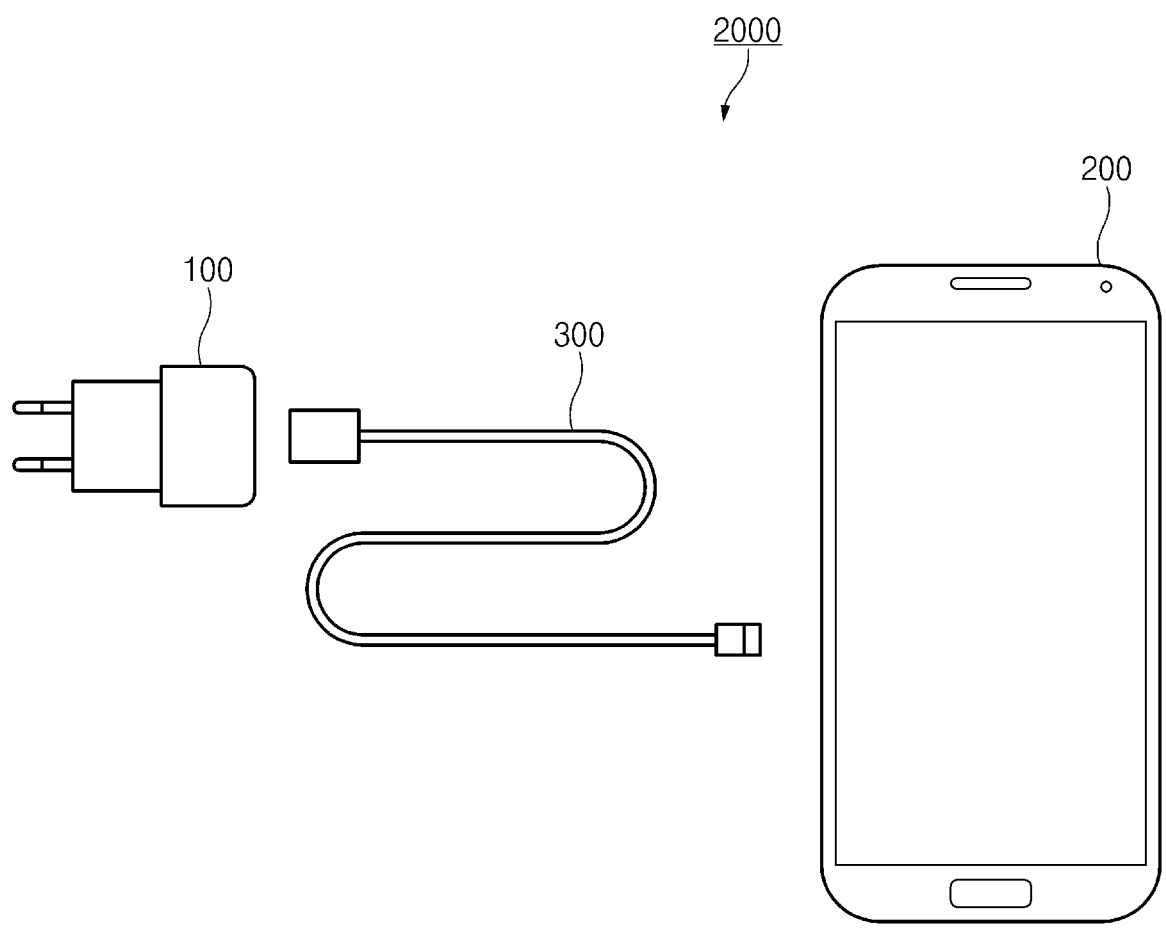
FIG. 3 illustrates a charging system of an electronic device, according to another embodiment of the present disclosure.

FIG. 3 illustrates a charging system of an electronic device, according to an embodiment of the present disclosure.

Referring to FIG. 3, a charging system 2000 includes an adapter device 100, a terminal device 200, and a cable device 300 (or a dongle). The adapter device 100 may receive power from an external or internal power source and may charge the terminal device 200 through the cable device 300. For example, the adapter device 100 may charge the terminal device 200 by using power, which is supplied from an external power source through a plug, or power supplied from an internal battery.

The adapter device 100 may support a quick charging function. The adapter device 100 may support a plurality of quick charging protocols. If the adapter device 100 is connected with the terminal device 200 through the cable device 300, the adapter device 100 may charge the terminal device 200 by using a quick charging protocol that the terminal device 200 supports (or requests).

The terminal device 200 may be a portable electronic device including a battery. The terminal device 200 may be a portable electronic device such as a smartphone, a tablet PC, a wearable device (e.g., a smart watch), or the like. The terminal device 200 may be an electronic device supporting the quick charging function. When the terminal device 200 supports the plurality of quick charging protocols, the terminal device 200 may be charged by using one quick charging protocol according to the selection of a user or preference set in advance.

Figure 4:
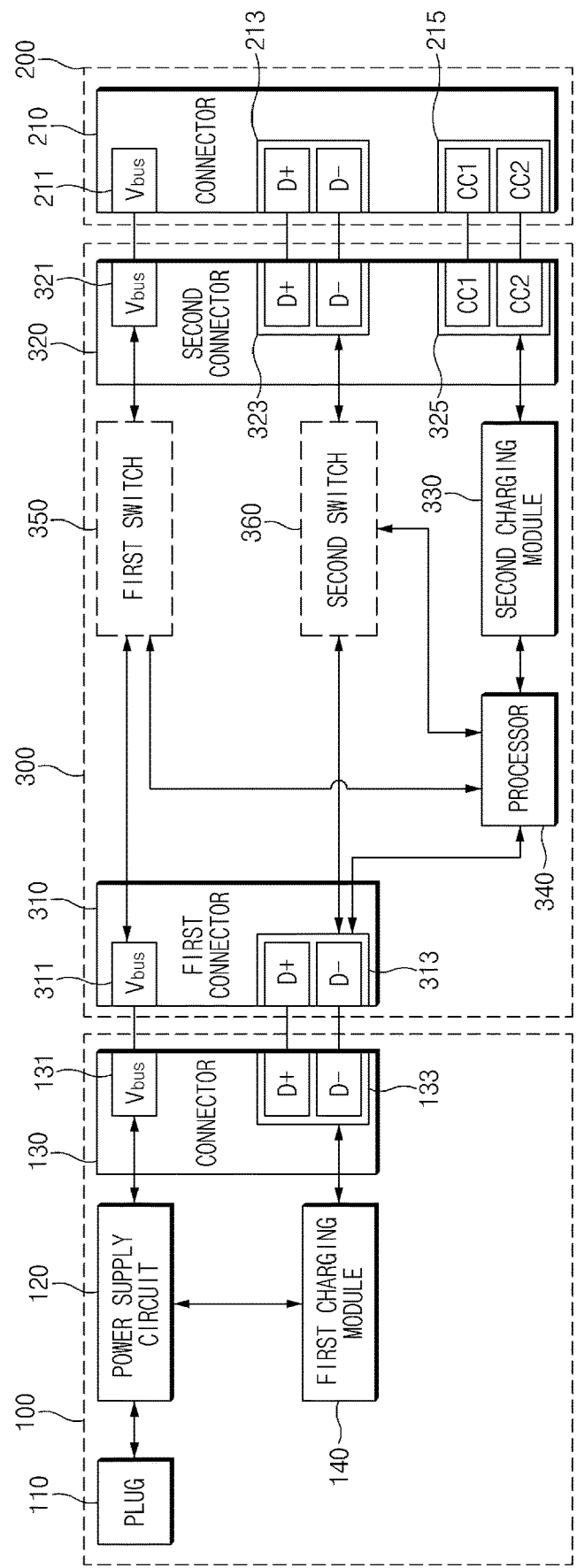
FIG. 4 is a block diagram of an adapter device and a cable, according to an embodiment of the present disclosure.

FIG. 4 is a block diagram illustrating configurations of an adapter device and a cable, according to an embodiment of the present disclosure.

Referring to FIG. 4, the adapter device 100 may include the plug 110, the power supply circuit 120, the connector 130, and the first charging module 140.

The plug 110 may be electrically connected with an external power source and may receive power from the external power source. For example, the plug 110 may be connected with an external outlet and may receive power from the outlet.

The adapter device 100 may include an internal battery for supplying power. For example, the adapter device 100 may include both the plug 110 and the internal battery or may include only one of the plug 110 and the internal battery.

The power supply circuit 120 may transmit power received from the plug 110 (or the internal battery) to the cable device 300 through the first pin 131 (e.g., a Vbus pin) of the connector 130. The power supply circuit 120 may include, for example, a pulse width modulation (PWM) module, an AC to DC converter, and a synchronous rectifier. The PWM module may control a voltage of power received from an outlet (or an internal battery) through the modulation of a pulse width. The AC to DC converter may convert an alternating current, which is received from the outlet, to a direct current. The synchronous rectifier may improve charging efficiency by converting the low voltage direct current signal into the high voltage direct current signal. The power supply circuit 120 may change a charging voltage or a charging current under control of the first charging module 140.

The connector 130 may be connected with the cable device 300. For example, the connector 130 may be connected with a first connector 310 included in the cable device 300. The connector 130 may include various types of connectors such as a USB type-A connector, a USB type-B connector, a USB type-C connector, a USB mini connector, a USB micro connector, a USB micro-B connector, and the like. The connector 130 may include a plurality of pins. The plurality of pins of the connector 130 may be in contact with a plurality of pins of the connector 310 included in the cable device 300, respectively and may form paths that make it possible to transmit or receive signals.

The first charging module 140 may communicate with the cable device 300 based on a first protocol. The first protocol may include a communication protocol using the first pin 131 (e.g., a D+ pin or a D− pin) of the connector 130. For example, the first protocol may include an AFC protocol or a QC protocol.

If the cable device 300 is connected with the connector 130, the first charging module 140 may transmit or receive first protocol-related information by using the second pin 133 (e.g., a D+ pin or a D− pin) of the connector 130 and may recognize that the cable device 300 is connected with the adapter device 100. For example, the first charging module 140 may execute an operation based on USB BC 1.2. In a USB BC 1.2 procedure, each of the adapter device 100 (e.g., the first charging module 140) and the terminal device 200 may exchange information, perform a support function, and the like of a counterpart device.

After the first charging module 140 opens the second pin 133 (e.g., a D+ pin or a D− pin) of the connector 130 for a specified time period (e.g., 1 sec) after the USB BC 1.2 procedure, the first charging module 140 may execute an operation for the AFC or the QC. For example, the first charging module 140 may open the second pin 133 by disconnecting a path that makes it possible to supply power to the second pin 133 (e.g., a D+ pin or a D− pin) of the connector 130. If a second pin 313 (e.g., a D+ pin or a D− pin) of the first connector 310 is opened for a specified time period (e.g., 1 sec), the cable device 300 (e.g., a processor 340) may recognize that the adapter device 100 supports the AFC.

The first charging module 140 may transmit a first voltage/current list, which the AFC or the QC supports and which is stored in an internal memory, to the cable device 300 through the second pin 133 (e.g., a D+ pin or a D− pin) of the connector 130 based on the first protocol. The first charging module 140 may receive charging request information from the cable device 300 through the second pin 133 (e.g., a D+ pin or a D− pin) of the connector 130 based on the first protocol. The charging request information may include information about a charging voltage or a charging current that the terminal device 200 requires. The terminal device 200 may select, for example, the charging voltage or the charging current based on a second voltage/current list. The first charging module 140 may change the charging voltage or the charging current of the power supply circuit 120 based on the charging request information that is received from the terminal device 200 through the cable device 300.

At least a part of the first voltage/current list, which the first charging module 140 supports, and the second voltage/current list that a second charging module 330 of the cable device 300 supports may be different. As such, the first charging module 140 may receive charging request information, which includes information about a charging voltage or a charging current and which is different from the first voltage/current list. If the information about the charging voltage or the charging current, which is included in the charging request information, is different from the first voltage/current list, the first charging module 140 may change the charging voltage or the charging current in view of a mapping table stored in the internal memory. For example, the mapping table may refer to a list in which items included in the second voltage/current list are mapped to items included in the first voltage/current list, respectively. The first charging module 140 may change the charging voltage or the charging current of the power supply circuit 120 based on a first charging voltage or a first charging current, which is respectively mapped to a second charging voltage or a second charging current corresponding to voltage and current information included in the charging request information. Even though information about a charging voltage or a charging current, which is included in the charging request information, is different from the first voltage/current list, the first charging module 140 may change a charging voltage or a charging current of the power supply circuit 120 based on the information about the charging voltage or the charging current, which is included in the charging request information.

Referring to FIG. 4, the cable device 300 includes the first connector 310, a second connector 320, the second charging module 330, a processor 340, a first switch 350 and a second switch 360.

The first connector 310 may be connected with the adapter device 100. For example, the first connector 310 may be connected with the connector 130 included in the adapter device 100. The first connector 310 may include various types of connectors such as a USB type-A connector, a USB type-B connector, a USB type-C connector, a USB mini connector, a USB micro connector, a USB micro-B connector, and the like. The first connector 310 may include a plurality of pins. The plurality of pins of the first connector 310 may be in contact with a plurality of pins of the connector 130 included in the adapter device 100, respectively and may form paths that make it possible to transmit or receive signals. The first connector 310 may receive power from the adapter device 100 through a first pin 311 (e.g., a Vbus pin) and may transmit the power to a first pin 321 (e.g., a Vbus pin) of the second connector 320. The first connector 310 may receive the first voltage/current list from the adapter device 100 through the second pin 313 (e.g., a D+ pin or a D− pin) and may transmit the first voltage/current list through a second pin 323 (e.g., a D+ pin or a D− pin) of the second connector 320.

The second connector 320 may be connected with the terminal device 200. For example, the second connector 320 may be connected with the connector 210 included in the terminal device 200. The second connector 320 may be a USB type-C connector. The second connector 320 may include a plurality of pins. The plurality of pins of the second connector 320 may be in contact with a plurality of pins of the connector 210 included in the terminal device 200, respectively and may form paths to transmit or receive signals. The second connector 320 may transmit power, which is received from the first connector 310, to the terminal device 200 through the first pin 321 (e.g., a Vbus pin). The second connector 320 may transmit the first voltage/current list, which is received from the first connector 310, to the terminal device 200 through the second pin 323 (e.g., a D+ pin or a D− pin).

The second charging module 330 may communicate with the terminal device 200 based on a second protocol. The second protocol may include a communication protocol using a third pin 325 (e.g., a CC1 pin or a CC2 pin) of the second connector 320. For example, the second protocol may include a USB PD protocol.

If the terminal device 200 is connected with the second connector 320, the second charging module 330 may transmit or receive second protocol-related information by using the third pin 325 (e.g., a CC1 pin or a CC2 pin) of the second connector 320 and may recognize that the terminal device 200 is connected with the cable device 300. For example, if a voltage across a pull-down resistor of the third pin 325 (e.g., a CC1 pin or a CC2 pin) of the second connector 320 is changed from a first voltage to a second voltage (e.g., the voltage is changed from 5 V to 2 V), the second charging module 330 may recognize that the terminal device 200 (or an UFP) is connected with the cable device 300. If a voltage across a pull-down resistor of the third pin 215 (e.g., a CC1 pin or a CC2 pin) of the connector 210 is changed from a third voltage to the second voltage (e.g., the voltage is changed from 0 V to 2 V), the terminal device 200 may recognize that the terminal device 200 (or a DFP) is connected with the terminal device 200. In the case where the cable device 300 and the terminal device 200 are connected, the second connector 320 of the cable device 300 may be a DFP, and the connector 210 of the terminal device 200 may be a UFP.

The second charging module 330 may transmit the second voltage/current list, which is stored in the internal memory and which USB PD supports, to the terminal device 200 through the third pin 325 (e.g., a CC1 pin or a CC2 pin) of the second connector 320 based on the second protocol. When the adapter device 100 does not support first protocol-related charging, the second charging module 330 may not transmit the second voltage/current list. For example, if the adapter device 100 does not support the first protocol-related charging, the second charging module 330 may transmit a specified voltage and current information (e.g., 5V and 1A) instead of the second voltage/current list. The second charging module 330 may receive charging request information from the terminal device 200 through the third pin 325 (e.g., a CC1 pin or a CC2 pin) of the second connector 320 based on the second protocol. The charging request information may include, for example, information about a charging voltage or a charging current that the terminal device 200 requires. In the case where the terminal device 200 performs charging based on the second protocol, the terminal device 200 may select, for example, the charging voltage or the charging current based on the second voltage/current list. If the specified voltage and current information is received from the cable device 300 instead of the second voltage/current list, the terminal device 200 may transmit charging request information including the specified voltage and current information to the cable device 300. The terminal device 200 may transmit the charging request information to the cable device 300 through the third pin 215 (e.g., a CC1 pin or a CC2 pin) of the connector 210 based on the second protocol. The second charging module 330 may transmit second protocol-related charging request information to the processor 340.

The second charging module 330 may store the first voltage/current list in the internal memory. For example, if the first connector 310 is connected with the connector 130 of the adapter device 100, the processor 340 may receive the first voltage/current list from the adapter device 100 (e.g., the first charging module 140) through the second pin 313 (e.g., a D+ pin or a D− pin) of the first connector 310 based on the first protocol, may change the first voltage/current list based on the second protocol, and may transmit the changed first voltage/current list to the second charging module 330. If the information about the charging voltage or the charging current, which is included in the charging request information, is different from the first voltage/current list, the second charging module 330 may change the charging voltage or the charging current based on the mapping table stored in the internal memory. For example, the mapping table may refer to a list in which items included in the second voltage/current list are mapped to items included in the first voltage/current list, respectively. The second charging module 330 may change the charging voltage or the charging current corresponding to voltage and current information included in charging request information based on a first charging voltage or a first charging current, which is respectively mapped to a second charging voltage or a second charging current corresponding to charging information included in the charging request information.

The processor 340 may convert the second protocol-related charging request information (or a second signal), which is received from the second charging module 330, to first protocol-related charging request information (or a first signal). For example, the processor 340 may convert a second protocol-related packet structure to a first protocol-related packet structure. The processor 340 may transmit the first protocol-related charging request information to the first charging module 140 of the adapter device 100 through the second pin 313 (e.g., a D+ pin or a D− pin) of the first connector 310.

Although FIG. 4 illustrates the second charging module 330 and the processor 340 as being separate, the present disclosure is not limited thereto and the second charging module 330 and the processor 340 may be implemented with one or more hardware modules (or a chip).

The first switch 350 may be located between the first pin 311 (e.g., a Vbus pin) of the first connector 310 and the first pin 321 (e.g., a Vbus pin) of the second connector 320. The first switch 350 may control power that is supplied from the first pin 311 of the first connector 310 to the first pin 321 of the second connector 320 under control of the processor 340. In a state where the terminal device 200 is not connected with the second connector 320, the processor 340 may turn off the first switch 350. In a state where the terminal device 200 is connected with the second connector 320, the processor 340 may turn on the first switch 350. The first switch 350 may be controlled by the second charging module 330.

The second switch 360 may be located between the second pin 313 (e.g., a D+ pin or a D− pin) of the first connector 310 and the second pin 323 (e.g., a D+ pin or a D− pin) of the second connector 320. The second switch 360 may control data transmission path between the second pin 313 of the first connector 310 and the second pin 323 of the second connector 320 under control of the processor 340. If a signal based on the second protocol is transmitted or received through the second charging module 330, the processor 340 may turn off the second switch 360. The second switch 360 may be controlled by the second charging module 330. At least a part of the first switch 350 and the second switch 360 may be omitted.

The charging technology using the second protocol may be supported by adding the second charging module 330 and the processor 340 to the cable device 300 without changing a configuration of an adapter device supporting charging technology using the first protocol.

Figure 5:
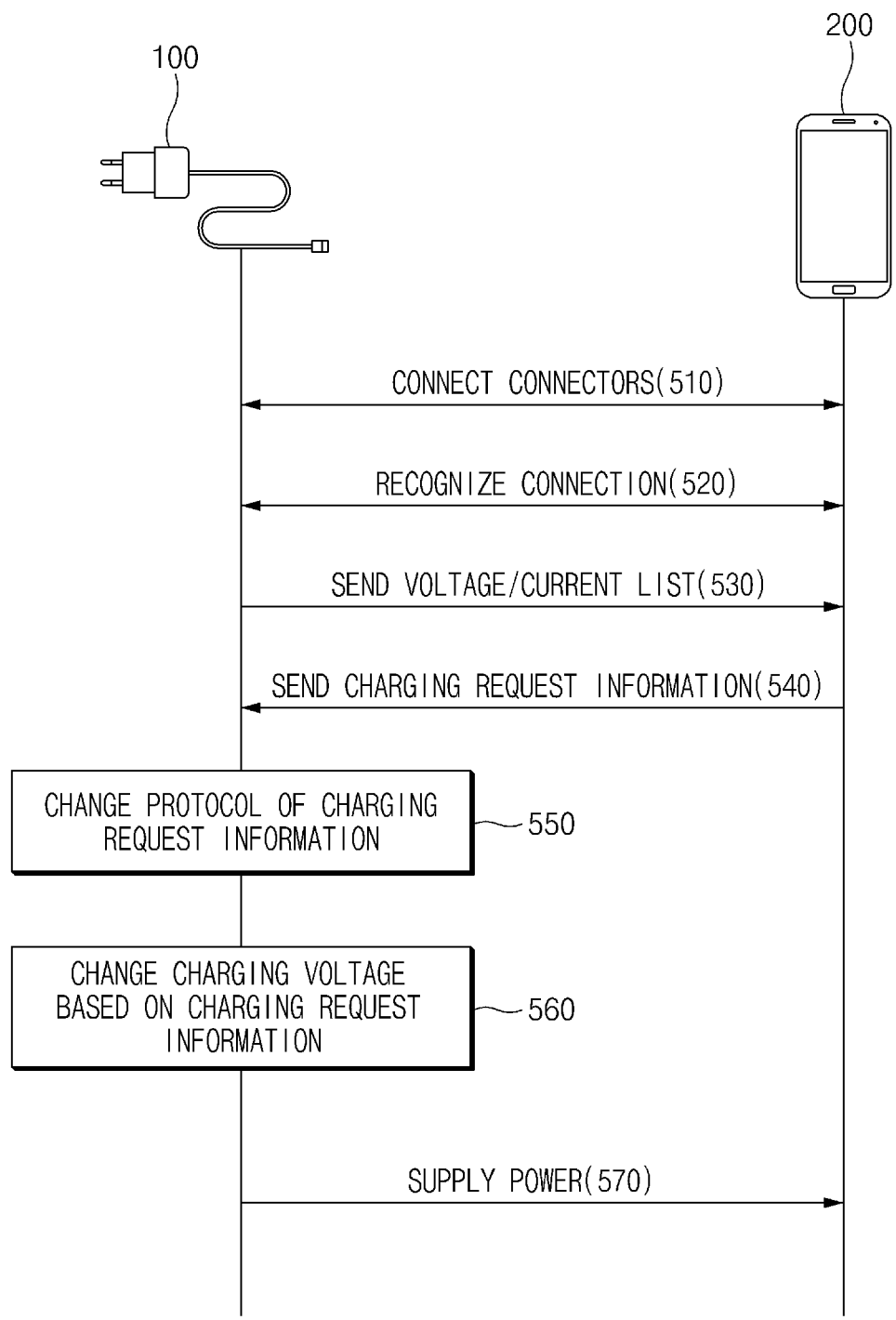
FIG. 5 is a flow diagram of a charging method of a charging system, according to an embodiment of the present disclosure.

FIG. 5 is a flow diagram of a charging method of a charging system, according to an embodiment of the present disclosure.

The flow diagram of FIG. 5 may include operations which the charging system 1000 illustrated in FIGS. 1 and 2 processes. Accordingly, even though omitted below, a description of the charging system 1000 described with reference to FIGS. 1 to 2 may be applied to the flow diagram of FIG. 5.

In step 510, the adapter device 100 and the terminal device 200 are connected with each other through a connector. Each of connectors included in the adapter device 100 and the terminal device 200 may be a USB type-C connector. The adapter device 100 may support both charging technology using a first protocol and charging technology using a second protocol, and the terminal device 200 may be a device supporting the charging technology using the second protocol.

In step 520, each of the adapter device 100 and the terminal device 200 recognizes that a counterpart device is connected with each other. The adapter device 100 and the terminal device 200 may transmit or receive second protocol-related information by using a third pin (e.g., a CC1 pin or a CC2 pin) of a connector. Each of the adapter device 100 and the terminal device 200 may recognize that a counterpart device is connected with each other.

In step 530, the adapter device 100 (e.g., the second charging module 150) transmits a second voltage/current list, which the charging technology using the second protocol supports, to the terminal device 200. For example, the adapter device 100 may transmit a voltage/current list, which USB PD supports, to the terminal device 200 through a CC1 pin or a CC2 pin based on the second protocol.

In step 540, the terminal device 200 transmits second protocol-related charging request information to the adapter device 100. The charging request information may include, for example, information about a charging voltage or a charging current that the terminal device 200 expects. The terminal device 200 may select a charging voltage or a charging current based on the second voltage/current list received from the adapter device 100.

In step 550, the adapter device 100 (e.g., the processor 160) changes a protocol of the charging request information. The adapter device 100 may convert the second protocol-related charging request information (or a second signal) to first protocol-related charging request information (or a first signal). For example, the adapter device 100 may convert a second protocol-related packet structure to a first protocol-related packet structure.

In step 560, the adapter device 100 (e.g., the first charging module 140) changes the charging voltage or the charging current based on the charging request information. The adapter device 100 may change the charging voltage or the charging current based on information about the charging voltage or the charging current, which is included in the charging request information. If the information about the charging voltage or the charging current, which is included in the charging request information, is different from a first voltage/current list that charging technology using the first protocol supports, the adapter device 100 may change the charging voltage or the charging current based on a mapping table.

In step 570, the adapter device 100 supplies power to the terminal device 200 based on the changed charging voltage or the changed charging current. The adapter device 100 may supply power to the terminal device 200 through a first pin (e.g., a Vbus pin) of a connector.

Figure 6:
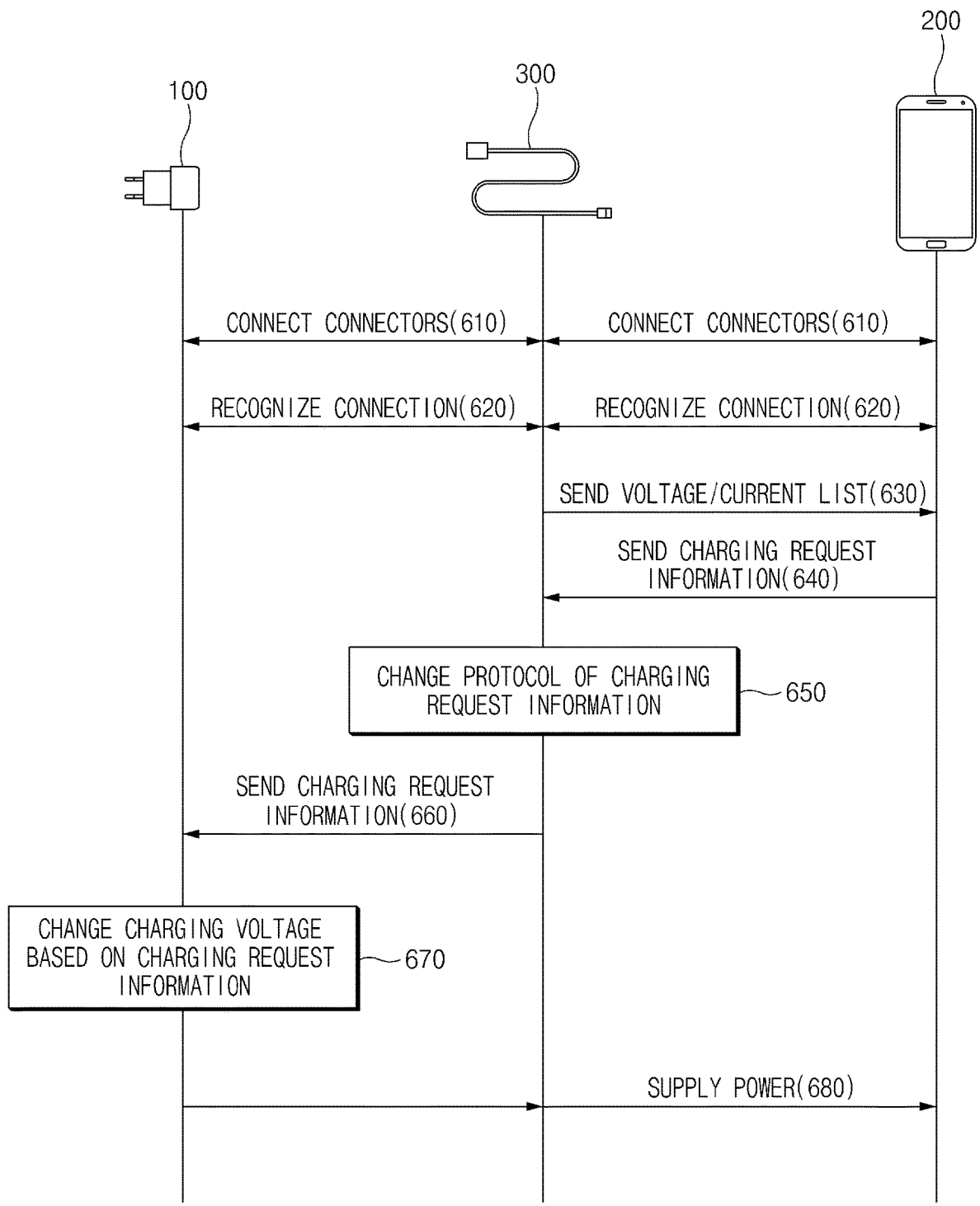
FIG. 6 is a flow diagram of a charging method of a charging system, according to another embodiment of the present disclosure.

FIG. 6 is a flow diagram of a charging method of a charging system, according to another embodiment of the present disclosure.

The flow diagram of FIG. 6 may include operations which the charging system 2000 illustrated in FIGS. 3 and 4 processes. Accordingly, a description of the charging system 2000 described with reference to FIGS. 3 to 4 may be applied to the flow diagram of FIG. 6.

In step 610, the adapter device 100, the terminal device 200 and the cable device 300 are connected with one another through a connector. The connector that connects the adapter device 100 with the cable device 300 may be a USB type-A connector, a USB type-B connector, a USB type-C connector, a USB mini connector, a USB micro connector, or a USB micro-B connector. The connector that connects the terminal device 200 with the cable device 300 may be a USB type-C connector. The adapter device 100 may support charging technology using a first protocol, and the terminal device 200 may be a device supporting the charging technology using a second protocol.

In step 620, each of the adapter device 100, the terminal device 200, and the cable device 300 recognize that a counterpart device is connected with each other. The adapter device 100 and the cable device 300 may transmit or receive first protocol-related information by using a second pin (e.g., a D+ pin or a D− pin) of the connector. Each of the adapter device 100 and the cable device 300 may recognize that a counterpart device is connected with each other. For example, the adapter device 100 and the cable device 300 may execute an operation based on the USB BC 1.2.

The terminal device 200 and the cable device 300 may transmit or receive second protocol-related information using a third pin (e.g., a CC1 pin or a CC2 pin) of a connector. Each of the cable device 300 and the terminal device 200 may recognize that a counterpart device is connected with each other. For example, if a voltage across a pull-down resistor of a CC1 pin or a CC2 pin is changed from a first voltage to a second voltage (e.g., the voltage is changed from 5 V to 2 V), the second charging module 330 may recognize that the terminal device 200 (or an UFP) is connected with the cable device 300.

In step 630, the cable device 300 (e.g., the second charging module 330) transmits a second voltage/current list, which the charging technology using the second protocol supports, to the terminal device 200. For example, the cable device 300 may transmit a voltage/current list, which USB PD supports, to the terminal device 200 through a CC1 pin or a CC2 pin based on the second protocol.

In step 640, the terminal device 200 transmits second protocol-related charging request information to the cable device 300. The charging request information may include, for example, information about a charging voltage or a charging current that the terminal device 200 requires. The terminal device 200 may select a charging voltage or a charging current based on the second voltage/current list received from the cable device 300.

In step 650, the cable device 300 (e.g., the processor 340) changes a protocol of the charging request information. The cable device 300 may convert the second protocol-related charging request information (or a second signal) to first protocol-related charging request information (or a first signal). For example, the cable device 300 may convert a second protocol-related packet structure to a first protocol-related packet structure.

In step 660, the cable device 300 transmits the first protocol-related charging request information to the adapter device 100. For example, the cable device 300 may transmit the first protocol-related charging request information through a second pin (e.g., a D+ pin or a D− pin) of a connector.

In step 670, the adapter device 100 (e.g., the first charging module 140) changes the charging voltage or the charging current based on the charging request information. The adapter device 100 may change the charging voltage or the charging current based on information about the charging voltage or the charging current, which is included in the charging request information. If the information about the charging voltage or the charging current, which is included in the charging request information, is different from a first voltage/current list that the charging technology using the first protocol supports, the adapter device 100 may change the charging voltage or the charging current based on a mapping table.

In step 680, the adapter device 100 supplies power to the terminal device 200 through the cable device 300 based on the changed charging voltage or the changed charging current. The power supplied from the adapter device 100 to the terminal device 200 may be transmitted through a first pin (e.g., a Vbus pin) of each connector.

The term "module", as used herein, may represent, for example, a unit including one or more combinations of hardware, software and firmware. The term "module" may be interchangeably used with the terms "unit", "logic", "logical block", "component" and "circuit". A "module" may be a minimum unit of an integrated component or may be a part thereof. A "module" may be a minimum unit for performing one or more functions or a part thereof. A "module" may be implemented mechanically or electronically. For example, a "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) may be, for example, implemented by instructions stored in a non-transitory computer-readable storage media in the form of a program module. The instructions, when executed by a processor, may cause the one or more processors to perform a function corresponding to the instructions. A non-transitory computer-readable recording medium may include a hard disk, a magnetic media, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). The program instructions may include machine language codes generated by compilers and high-level language codes that may be executed by computers using interpreters. The above-mentioned hardware device may be configured to operate as one or more software modules to perform operations according to an embodiment of the present disclosure, and vice versa.

A module or a program module, according to an embodiment of the present disclosure, may include at least one of the above-mentioned elements, or some elements may be omitted or other additional elements may be added. Operations performed by the module, the program module or other elements may be performed in a sequential, parallel, iterative or heuristic way. Furthermore, some operations may be performed in another order or may be omitted, or other operations may be added.

According to an embodiment of the present disclosure, a charging function based on a new protocol may be supported through a circuit capable of communicating with a conventional circuit without changing the design of the circuit supporting a conventional charging technology.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a connector that connects with an external electronic device, wherein the connector includes a first pin and a second pin and provides connections using a first protocol and a second protocol;
   a plug that connects with an external power source;
   a power supply circuit configured to supply power to the external electronic device through the connector;
   a first charging module configured to control a charging voltage and a charging current of the power supply circuit based on charging request information received through the first pin including a D+ pin or a D− pin of the connector;
   a second charging module configured to receive second protocol-related charging request information from the external electronic device through the second pin including a CC1 pin or a CC2 pin of the connector;
   a switch connected between the first charging module and the first pin; and
   a processor configured to, in response to the second-protocol related charging request information:
   convert the second protocol-related charging request information to first protocol-related charging request information,
   transmit the converted first protocol-related charging request information to the first charging module, and
   disconnect a path between the first charging module and the first pin using the switch,
   wherein, when a first charging voltage and a first charging current included in the converted first protocol-related charging request information does not match with a first list including voltages and currents for the first protocol, the first charging module converts the first charging voltage and the first charging current to a second charging voltage and a second charging current corresponding to the first list using mapping information between the first list and a second list, and
   wherein the second list includes voltages and currents for the second protocol.

2. The electronic device of claim 1, wherein the connector comprises a universal serial bus (USB) type-C connector.

3. The electronic device of claim 1, wherein the first protocol comprises a communication protocol using the first pin of the connector, and
   wherein the second protocol comprises a communication protocol using the second pin of the connector.

4. The electronic device of claim 1, wherein, if the connector is connected with the external electronic device, the second charging module transmits the second list comprising voltage and current information that a second protocol-related charging method supports, to the external electronic device through the connector, and receives the second protocol-related charging request information, which is generated based on the second list, from the external electronic device.

5. A charging method of an electronic device connected with an external electronic device through a connector, the method comprising:
   receiving, by a second charging module, second protocol-related charging request information from the external electronic device through a second pin including a CC1 pin or a CC2 pin of the connector;
   converting the second protocol-related charging request information to first protocol-related charging request information;
   changing, by a first charging module, a charging voltage or a charging current of a power supply circuit based on the converted first protocol-related charging request information;
   disconnecting, in response to the second protocol-related charging request information, a path between the first charging module and a first pin including a D+ pin or a D− pin of the connector using a switch of the electronic device; and
   supplying, by the power supply circuit, power to the external electronic device through the connector based on the changed charging voltage or charging current,
   wherein the connector provides connections using the first protocol and the second protocol,
   wherein, when a first charging voltage and a first charging current included in the converted first protocol-related charging request information does not match with a first list including voltages and currents for the first protocol, the first charging module converts the first charging voltage and the first charging current to a second charging voltage and a second charging current corresponding to the first list using mapping information between the first list and a second list, and wherein the second list includes voltages and currents for the second protocol.

6. The method of claim 5, wherein the connector comprises a USB type-C connector.

7. The method of claim 5, wherein receiving the second protocol-related charging request information comprises:

if the connector is connected with the external electronic device, transmitting the second list comprising voltage and current information, which a second protocol-related charging method supports, to the external electronic device through the connector; and receiving the second protocol-related charging request information, which is generated based on the second list, from the external electronic device.

* * * * *